Patented Aug. 20, 1935

2,011,570

UNITED STATES PATENT OFFICE 2,011,570

PROCESS FOR THE PRODUCTION OF METHYLAMINE

Henry Dreyfus, London, England

No Drawing. Application February 11, 1933, Serial No. 656,368. In Great Britain March 9, 1932

6 Claims. (Cl. 260—127)

This invention relates to the production of methylamines from hydrogen cyanide.

According to the invention methylamines are produced by subjecting hydrogen cyanide to treatment with hydrogen (or a gas containing and preferably rich in hydrogen) in the presence of a catalyst consisting of or comprising one or more of certain metals, viz. copper, zinc, cobalt, tin or silver. The catalyst may also contain one or more cyanides of alkali and/or earth alkali metals, i. e. cyanides of metals at least as electropositive as calcium.

In carrying out the process of the invention the catalyst may be used in any convenient form, for example, spread or precipitated upon suitable carriers, such for instance as pumice, carborundum, kieselguhr or the like.

The process may be carried out in any convenient manner, for example by passing the mixture comprising hydrogen cyanide and hydrogen through fireclay, fused silica, copper or other tubes, or other forms of apparatus containing the catalysts and heated to the desired temperature, e. g. electrically.

The mixture comprising hydrogen cyanide and hydrogen to be subjected to the reaction may of course be produced in any convenient or desired manner. Thus, for example, gaseous hydrogen cyanide and hydrogen may be simply mixed together in the desired proportions, or, for example, a current of hydrogen or a gas containing the same may be passed in a regulated stream over or through liquefied hydrogen cyanide and the resultant mixture subjected to the reaction.

The proportion of hydrogen to hydrogen cyanide may vary within wide limits, but when monomethylamine is to be produced as sole or main reaction product mixtures comprising hydrogen and hydrogen cyanide containing a considerable proportion of hydrogen, for example 12–16 volumes or more of hydrogen to 1 volume of hydrogen cyanide are preferably employed. Lower proportions of hydrogen should be employed when more di- and trimethylamine and less monomethylamine is required in the reaction product.

The reaction product may be treated in any desired manner to recover the methylamines. For example, the gaseous product may be absorbed in dilute hydrochloric acid.

In carrying out the process temperatures of between about 150–500° C. may be employed with advantage and especially temperatures of about 200–350° C. The reaction may be carried out under super-atmospheric pressure, ordinary pressure or under reduced pressure.

A convenient method of larrying out the process of the invention comprises passing a current of hydrogen over or through liquid hydrogen cyanide in such manner as to give a mixture of hydrogen cyanide and hydrogen containing about 94% by volume of hydrogen. The mixture is then passed through the reaction vessel (e. g. a copper tube) containing the catalyst, such for instance as finely divided copper spread or deposited upon pumice or the like and heated to a temperature of about 250–300° C., and the issuing reaction vapours may be washed with dilute acid (e. g. hydrochloric acid) to absorb the methylamine which may subsequently be isolated in any convenient manner.

The gases after being washed or otherwise treated for the removal of the methylamine may be dried and returned to the vaporizer for recirculation through the apparatus.

Before being subjected to reaction the mixture of hydrogen and hydrogen cyanide (or either, or both, separately) may be preheated. If desired this may be effected, partly or wholly, by heat exchange with the gases and vapours issuing from the reaction zone.

The following example illustrates the invention, but it is to be understood that the invention is in no way limited thereto.

Example

Into a stream of hydrogen preheated to 100° C. hydrogen cyanide is sprayed at a rate of 50–60 grams per cubic metre of hydrogen. The resulting mixture is passed in a rapid stream into contact with a catalyst contained in a reaction tube maintained at a temperature of 275–280° C. The catalyst is produced by reducing with hydrogen, at a temperature of 240–250° C., granules of cuprous oxide obtained by melting black copper oxide and granulating the product obtained on solidification.

The gases issuing from the tube are cooled by heat exchange with fresh hydrogen being supplied to the reaction tube and are then fed into a tower, maintained at room temperature, in which they are scrubbed with dilute hydrochloric acid to absorb the reaction products which consist mainly of monomethylamine together with some ammonia and small quantities of dimethylamine and trimethylamine. The residual hydrogen, after drying, can be re-used in the process.

What I claim and desire to secure by Letters Patent is:—

1. Process for the manufacture of methylamine which comprises subjecting hydrogen cyanide to treatment in the vapor phase with hydrogen in presence of a hydrogenating metal selected from the group consisting of copper, zinc, cobalt, tin and silver, and a cyanide of a metal at least as electro-positive as calcium.

2. Process for the manufacture of methylamine which comprises subjecting hydrogen cyanide to treatment in the vapor phase with hydrogen at temperatures of 200 to 350° C. and in presence of a hydrogenating metal selected from the group consisting of copper, zinc, cobalt, tin and silver, and a cyanide of a metal at least as electro-positive as calcium.

3. Process for the manufacture of methylamine which comprises subjecting hydrogen cyanide to treatment in the vapor phase with hydrogen at temperatures of 150 to 500° C. and in presence of a hydrogenating metal selected from the group consisting of copper, zinc, cobalt, tin and silver, and a cyanide of a metal at least as electro-positive as calcium.

4. Process for the manufacture of methylamine which comprises subjecting hydrogen cyanide to treatment in the vapor phase with 12 to 16 times its own volume of hydrogen in presence of a hydrogenating metal selected from the group consisting of copper, zinc, cobalt, tin and silver, and a cyanide of a metal at least as electro-positive as calcium.

5. Process for the manufacture of methylamine which comprises subjecting hydrogen cyanide to treatment in the vapor phase with 12 to 16 times its own volume of hydrogen, at temperatures of 150 to 500° C. in presence of a hydrogenating metal selected from the group consisting of copper, zinc, cobalt, tin and silver, and a cyanide of a metal at least as electro-positive as calcium.

6. Process for the manufacture of methylamine which comprises subjecting hydrogen cyanide to treatment in the vapor phase with 12 to 16 times its own volume of hydrogen, at temperatures of 200 to 350° C. in presence of a hydrogenating metal selected from the group consisting of copper, zinc, cobalt, tin and silver, and a cyanide of a metal at least as electro-positive as calcium.

HENRY DREYFUS.